United States Patent
Bailey et al.

(10) Patent No.: US 6,654,898 B1
(45) Date of Patent: Nov. 25, 2003

(54) STABLE CLOCK GENERATION INTERNAL TO A FUNCTIONAL INTEGRATED CIRCUIT CHIP

(75) Inventors: Robert L. Bailey, La Selva Beach, CA (US); Brian D. Howard, Portola Valley, CA (US); Michael F. Culbert, San Jose, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/567,196

(22) Filed: May 8, 2000

Related U.S. Application Data

(60) Provisional application No. 60/144,271, filed on Jul. 15, 1999.

(51) Int. Cl.$^7$ ................................................ G06F 1/04
(52) U.S. Cl. ............................ 713/500; 713/1; 713/600
(58) Field of Search ..................... 713/1, 2, 300, 713/320, 322, 500, 501, 600

(56) References Cited

U.S. PATENT DOCUMENTS

| | | | |
|---|---|---|---|
| 5,347,232 A | | 9/1994 | Nishimichi |
| 5,461,649 A | * | 10/1995 | Bailey et al. ............... 327/28 |
| 5,473,767 A | | 12/1995 | Kardach et al. |
| 5,560,001 A | | 9/1996 | Kardach et al. |
| 5,642,388 A | | 6/1997 | Evoy |
| 5,706,485 A | | 1/1998 | Barkatullah et al. |
| 5,742,800 A | * | 4/1998 | Forehand ..................... 713/500 |
| 5,754,837 A | | 5/1998 | Walsh et al. |
| 5,774,701 A | * | 6/1998 | Matsui et al. ............... 713/501 |
| 5,842,029 A | | 11/1998 | Conary et al. |
| 5,864,564 A | | 1/1999 | Levitt et al. |
| 5,900,757 A | | 5/1999 | Aggarwal et al. |
| 5,991,888 A | * | 11/1999 | Faulkner et al. ........... 713/501 |
| 6,021,500 A | * | 2/2000 | Wang et al. ................ 713/320 |
| 6,304,979 B1 | | 10/2001 | Bacigalupo |
| 6,311,287 B1 | | 10/2001 | Dischler et al. |

* cited by examiner

Primary Examiner—Dennis M. Butler
(74) Attorney, Agent, or Firm—Beyer Weaver & Thomas, LLP

(57) ABSTRACT

Methods and apparatus that provide stable clock generation within a functional integrated circuit are disclosed. The functional integrated circuit provides a function other than clock generation, such as a peripheral or interrupt control. Typically, the clock generation is phase-lock loop (PLL) based. The functional integrated circuit also typically provides power savings modes to conserve power consumption.

27 Claims, 9 Drawing Sheets

US 6,654,898 B1

STABLE CLOCK GENERATION INTERNAL TO A FUNCTIONAL INTEGRATED CIRCUIT CHIP

CROSS-REFERENCE TO RELATED APPLICATION

This application claims the benefit of U.S. Provisional Application Ser. No. 60/144,271, filed Jul. 15, 1999, and entitled "STABLE CLOCK GENERATION INTERNAL TO A FUNCTIONAL INTEGRATED CIRCUIT CHIP", the content of which is hereby incorporated by reference.

BACKGROUND OF THE INVENTION

1. Field of the Invention

The present invention relates to clock generation and, more particularly, to stable clock generation internal to a functional integrated circuit chip.

2. Description of the Related Art

Conventionally, clock generator chips have been separate integrated circuit chips provided to produce clocks of varying frequencies for use by other parts, namely, other integrated circuit chips, of an electrical circuit design. As an example, it is common for a computer system to include a separate clock generator chip to produce the various clocks of different frequencies used by the other circuitry within the computer system. Generally speaking, a clock generator chip will receive an input clock and produce a series of output clocks, each having a different frequency. The output clocks can have frequencies greater than or less than the frequency of the input clock.

FIG. 1 is a block diagram of a representative conventional clock generator chip 100. The clock generator chip 100 includes a multiplier 102 that receives an input clock. The multiplier 102 multiplies the input clock to a greater frequency and supplies the resulting clock to a series of dividers. Specifically, the clock generator chip 100 includes a divider 104 and a phase-lock loop (PLL) 106 which together produce a first clock signal (CLK1). The divider 104 receives the resulting clock from the multiplier 102 and supplies it to the PLL 106 which outputs the first clock (CLK1). The clock generator chip 100 also includes a divider 108 and a PLL 110 that produce a second clock (CLK2) in a similar manner. Further, the clock generator chip 100 includes a divider 112 and a PLL 114 that together produce a third clock (CLK3) also in a similar manner.

When the conventional clock generator chip 100 together with an external clock generator that produces the input clock are powered-on, the clock generator chip 100 is normally held in reset until the input clock has stabilized and propagated through the clock generator chip. Thereafter, the clock generator chip 100 can be released from reset such that the output clocks are able to be produced in a stable manner.

However, more recently, with the ever-increasing integration of functionality onto integrated circuit chips, the clock generator circuitry, including the PLLs, has been moved inside a functional chip. In such situations, there arise stability problems, or unstable conditions, which prevent the reliable generation of the desired clock signals. These unstable conditions can cause the PLLs to incorrectly lock to an unstable external clock if the external clock is powered-up before the functional chip is powered-up. Here, the external clock might not be able to stabilize with the functional chip being powered-off. Hence, when the functional chip is subsequently powered-up, the PLLs within the functional chip may incorrectly lock to the unstable external clock source. Also, if an input to the functional chip is driven while the functional chip is powered down, then the functional chip may experience destructive latch-up when it is subsequently powered up. Still further, if the external clock and the functional chip are powered-up at the same time but the PLLs within the functional chip are disabled while the chip is held in reset, no clocks are propagated through the logic of the functional chip held in reset, so the functional chip will not be properly reset. Also, when the PLLs are eventually enabled, they will drive the functional chip with the unstable clocks until the internal PLLs stabilize.

Thus, there is a need to provide improved techniques for powering on functional chips which include PLL-based clock generation circuitry.

SUMMARY OF THE INVENTION

Broadly speaking, the invention relates to stable clock generation within a functional integrated circuit. The functional integrated circuit provides a function other than clock generation, such as peripheral or interrupt control. Typically, the clock generation is phase-lock loop (PLL) based. The functional integrated circuit also typically provides power savings modes to conserve power consumption.

The invention can be implemented in numerous ways, including as a system, a device, an apparatus, and a method. Several embodiments of the invention are summarized below.

As an integrated circuit chip having internal functional circuitry, with the integrated circuit chip receiving an external clock, a reset signal and a clock stop signal, one embodiment of the invention includes: a clock control circuit that receives the reset signal and the clock stop signal and produces a clock control signal; a phase lock loop circuit that receives the external clock and produces a generated clock based on the external clock; a multiplexer that receives the external clock and the generated clock, and outputs at an output terminal one of the external clock and the generated clock as a selected clock based on the clock control signal; and a clock stopper to permit or block passage of the selected clock to the internal functional circuitry of the integrated circuit chip.

As a controller integrated circuit chip for providing control functions for a computer system, one embodiment of the invention includes an on-board clock generation circuit that produces a plurality of clocks, and functional controller circuitry that operates using the plurality of clocks. The on-board clock generation circuit includes at least: a phase lock loop circuit that receives the external clock and produces a generated clock based on the external clock; a multiplexer that receives the external clock and the generated clock, and outputs one of the external clock and the generated clock as a selected clock; and a clock stopper that operates to permit or block passage of the selected clock to the functional controller circuitry of the controller integrated circuit chip.

As a controller integrated circuit chip for providing control functions for a computer system, another embodiment of the invention includes an onboard clock generation circuit that produces a plurality of clocks, and functional controller circuitry that operates using the plurality of clocks. The on-board clock generation circuit includes at least: a phase lock loop circuit that receives the external clock and produces a generated clock based on the external clock; a clock stopper that operates to permit or block passage of either the external clock or the generated clock to the functional controller circuitry of the controller integrated circuit chip.

The on-board clock generation circuit also having a run mode and a low-power mode, in the run mode the internal clock is supplied to the functional controller circuitry, and in the low-power mode the clock stopper prevents either the external clock or the generated clock from being supplied to the functional controller circuitry.

As a computer system, one embodiment of the invention includes: a memory device that stores computer code; a microprocessor chip that executes the computer code; a peripheral bus; and a controller chip for the peripheral bus. The controller chip includes an on-board clock generation circuit that produces a plurality of clocks, and functional controller circuitry that operates using the plurality of clocks to control interaction with the peripheral bus. Further, the on-board clock generation circuit includes at least: a phase lock loop circuit that receives the external clock and produces a generated clock based on the external clock; a multiplexer that receives the external clock and the generated clock, and outputs one of the external clock and the generated clock as a selected clock; and a clock stopper that operates to permit or block passage of the selected clock to the functional controller circuitry of the controller chip.

As a method for powering up an integrated circuit chip having functional circuitry and internal clock generation circuitry including phase-locked loops (PLLs) to produce internal clocks, one embodiment of the invention includes the acts of: providing power to the integrated circuit chip and to an external clock source but not providing power to the PLLs; bypassing the PLLs to produce an externally generated clock, the externally generated clock being provided by the external clock source; permitting the externally generated clock to be supplied to the functional circuitry, thereby allowing processing of a reset operation while the PLLs are not producing the internal clocks; subsequently stopping the externally generated clock from being supplied to the functional circuitry after the reset operation is processed; providing power to the PLLs; unbypassing the PLLs after their output are stable; and thereafter permitting the internal clocks produced by the PLLs to be supplied to the functional circuitry, so as to operate the functional circuitry in a normal manner.

The advantages of the invention are numerous. Different embodiments or implementations may have one or more of the following advantages. One advantage of the invention is that stable clock generation with power management can be performed internal to a functional integrated circuit. Another advantage of the invention is that functional integrated circuits are able to be properly reset upon being initially powered-up. Yet another advantage of the invention is that phase-lock loops (PLLs) used in the clock generation lock to desired frequencies in a stable manner. Still another advantage of the invention is that PLLs and clocks can be started and stopped cleanly and in the proper sequence, without having to reset the logic associated with those clocks, for power management.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to stable clock generation within a functional integrated circuit. The functional integrated circuit provides a function other than clock generation, such as a controller operation. Typically, the clock generation is phase-lock loop (PLL) based. The functional integrated circuit also typically provides power savings modes to conserve power consumption.

Embodiments of the invention are discussed below with reference to FIGS. 2A–7. However, those skilled in the art will readily appreciate that the detailed description given herein with respect to these figures is for explanatory purposes as the invention extends beyond these limited embodiments. The invention is primarily discussed below with reference to input/output (I/O) controller chip; however, it should be understood that the invention is generally applicable to any type of functional integrated circuit (functional chip) that desires clock generation.

Figure 2B:
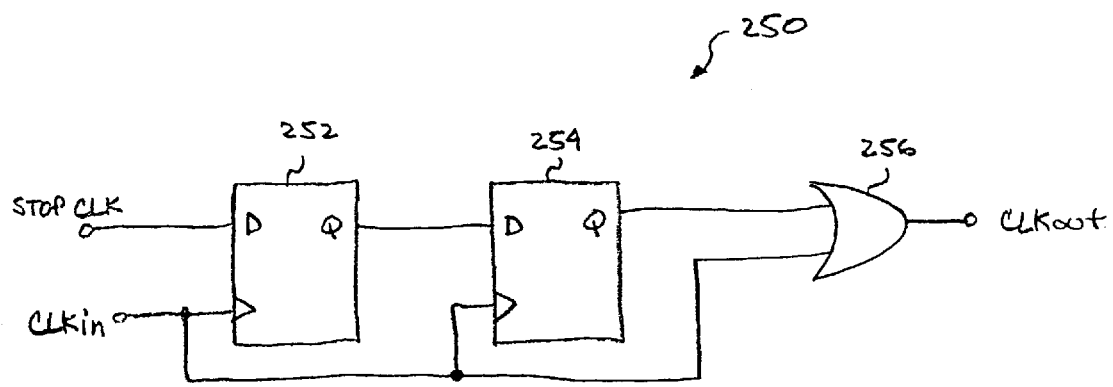
FIG. 2B is a schematic diagram of a clock start/stop circuit.
Figure 2A:
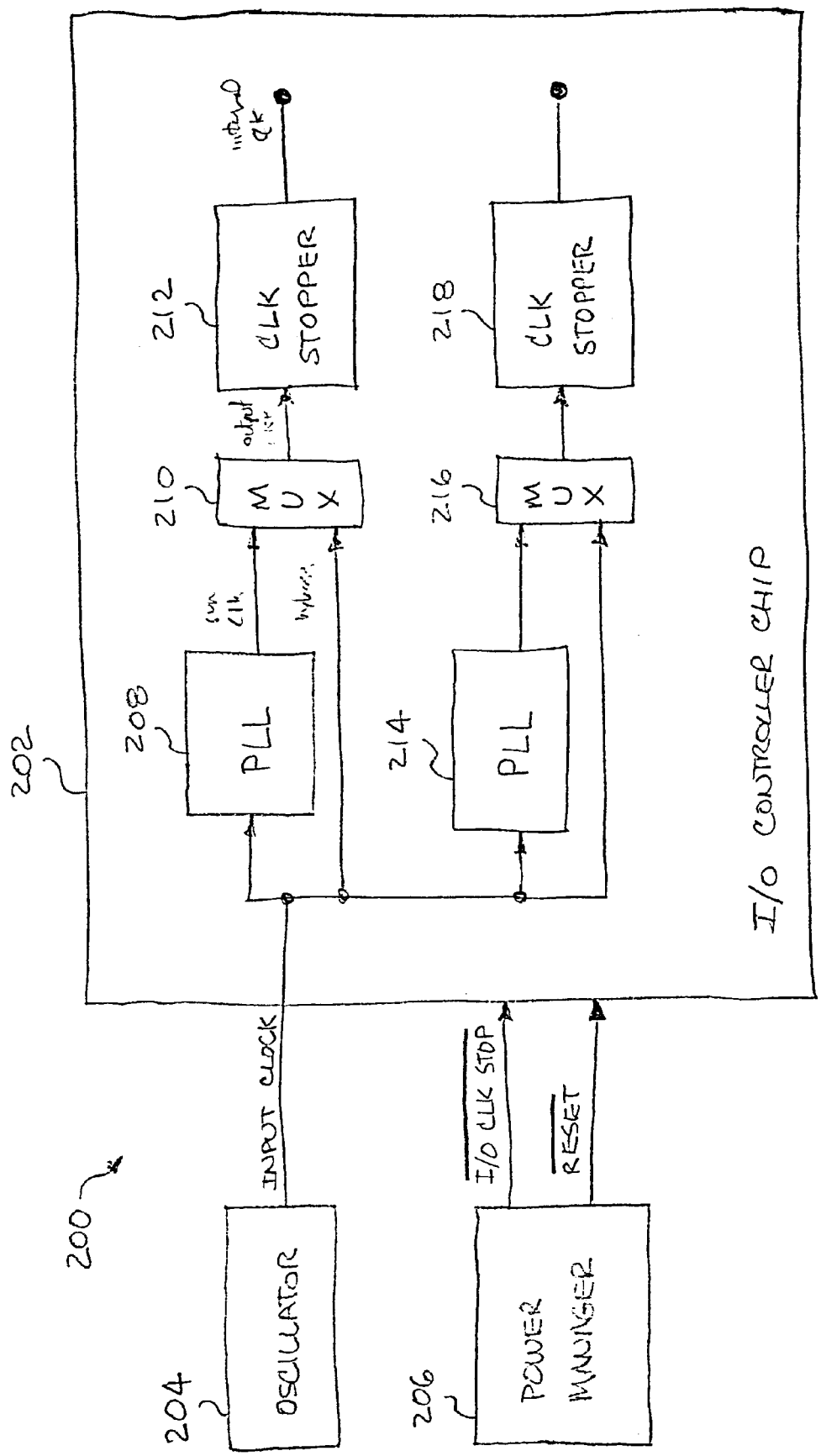
FIG. 2A is a block diagram of a portion of a computer system according to one embodiment of the invention.

FIG. 2A is a block diagram of a portion of a computer system 200 according to one embodiment of the invention. The computer system 200, among other things, includes an input/output (I/O) controller chip 202, an oscillator 204, and a power manager 206. The I/O controller chip 202 represents a functional integrated circuit chip that includes clock generation circuitry as well as functional circuitry. The portion of the I/O controller chip 202 illustrated in FIG. 2A pertains to the clock generation circuitry. The functional circuitry that would be associated with the I/O controller chip is conventional and well known in the art and thus not shown herein. Also, the computer system 200 includes various other integrated circuit chips (e.g., memory, microprocessor, bus, etc.) that are conventional and well known in the art, and thus not shown in FIG. 2A. Typically, the power manager 206 controls power management of various other integrated circuits within the computer system 200 besides the I/O controller chip 202.

Figure 1:
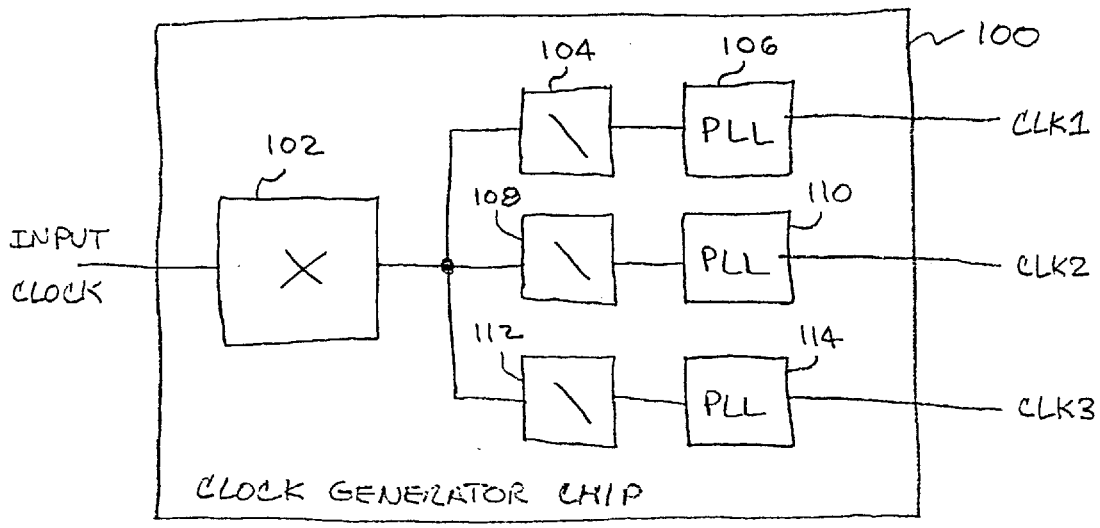
FIG. 1 is a block diagram of a representative conventional clock generator chip.

In any case, the clock generation circuitry within the I/O controller chip 202 includes a phase-lock loop (PLL) 208 that receives an input clock from the oscillator 204. The oscillator 204 can be considered an external clock generator for the I/O controller chip 202 and thus the input clock can be considered an external clock. The input clock produced by the oscillator 204 is supplied to the PLL 208. The PLL 208 is configured to output a clock signal at a particular frequency. In operation, the PLL 208 locks its output frequency to a predetermined frequency. Often, the predetermined frequency is greater than the frequency of the input clock. Although not shown in FIG. 2A, the PLL 208 can also perform multiplication and division operations so as to yield the predetermined frequency, such as conventionally done with the multiplier 102 and dividers 104, 108 and 112 shown in FIG. 1. These multipliers and dividers, if any, can be provided within the block 208 shown in FIG. 2A.

The PLL 208 is unstable during its initial startup period when it is attempting to stabilize so as to produce the predetermined frequency. Once stabilized, the output frequency PLL 208 is deemed locked. The output clock from the PLL 208 is supplied to a multiplexer 210. The multiplexer 210 also receives the input clock supplied by the oscillator 204. The input clock being supplied to the multiplexer 210 is also referred to herein as a bypass clock (or a reset clock) because it serves to bypass the PLL 208. The output clock produced by the PLL 208 is also referred to as a run clock (or a normal clock) because it serves as the normal, running clock for the I/O controller chip 202 when operational. The multiplexer 210 operates to select one of the run clock and the bypass clock to be output as a selected clock. The selected clock from the multiplexer 210 is then supplied to a clock stopper 212. The clock stopper 212 is controlled to be either active or inactive. When inactive, the clock stopper 212 passes the selected clock through the clock stopper 212 and thus supplies an internal clock to the functional circuitry of the I/O controller chip 202. On the other hand, when the clock stopper 212 is activated, the clock stopper 212 prevents the selected clock from being supplied to the functional circuitry. The I/O controller chip 202 can produce other internal clocks using similar circuitry. In particular, the I/O controller chip 202 also includes a PLL 214, a multiplexer 216 and a clock stopper 218 that together produce another internal clock of a different frequency for the functional circuitry within the I/O controller chip 202. Often, the I/O controller chip 202 will produce a series of internal clocks with different frequencies as different parts of the functionality circuitry require a clock with a particular frequency. For example, in one embodiment, the input clock is 18.432 MHz and seven (7) internal clocks with frequencies of 15.6672, 19.5840, 31.3344, 32.000, 45.1584, 48.000 and 49.1520 MHz are respectively produced. The clock stoppers 212 and 218 operate to output the internal clocks cleanly when starting and stopping (i.e., the internal clocks do not contain spikes or short clock segments).

According to the invention, to provide stable power-on for the I/O controller chip 202, the power manager 206 provides an I/O clock stop signal (I/O CLK STOP) and a reset signal (RESET) to the I/O controller chip 202. As noted by bar over these signal names, the I/O clock stop signal (I/O CLK STOP) and a reset signal (RESET) are active low in this embodiment, Together, these signals from the power manager 206 provide the I/O controller chip 202 with enough control information to not only place the I/O controller chip 202 in a sleep or shutdown mode to conserve power, but also power-on the clock generation circuitry in a manner in which stable clocks will be produced. The control sequencing for the I/O controller chip 202 during power-on as well as the sleep and shutdown modes is described below.

FIG. 2B is a schematic diagram of a clock stopper 250 suitable for use as the clock stoppers 212 and 218 of FIG. 2A. The clock stopper 250 is a circuit that can cleanly start or stop a clock from being output. The clock stopper 250 includes a first flip-flop circuit 252, a second flip-flop circuit 254, and a logical OR gate 256. In this embodiment, the first and second flip-flops 252 and 254 are data-type flip-flops. A stop clock signal (STOP CLK) is received at a data terminal of the first flip-flop 252. An input clock (CLKin) is received at a clock terminal of the first flip-flop 252 and the second flip-flop 254. An output terminal of the first flip-flop 252 connected to a data terminal of the second flip-flop 254. An output terminal of the second flip-flop 254 connects to one input terminal of the logical OR gate 256 and the input clock (CLKin) connects to the other input to the logical OR gate 256. The output of the logical OR gate 256 is an output clock (CLKout). The clock stopper 250 operates to output the output clock (CLKout) without any spikes or short clock segments following either a start or stop operation.

Figure 3A:
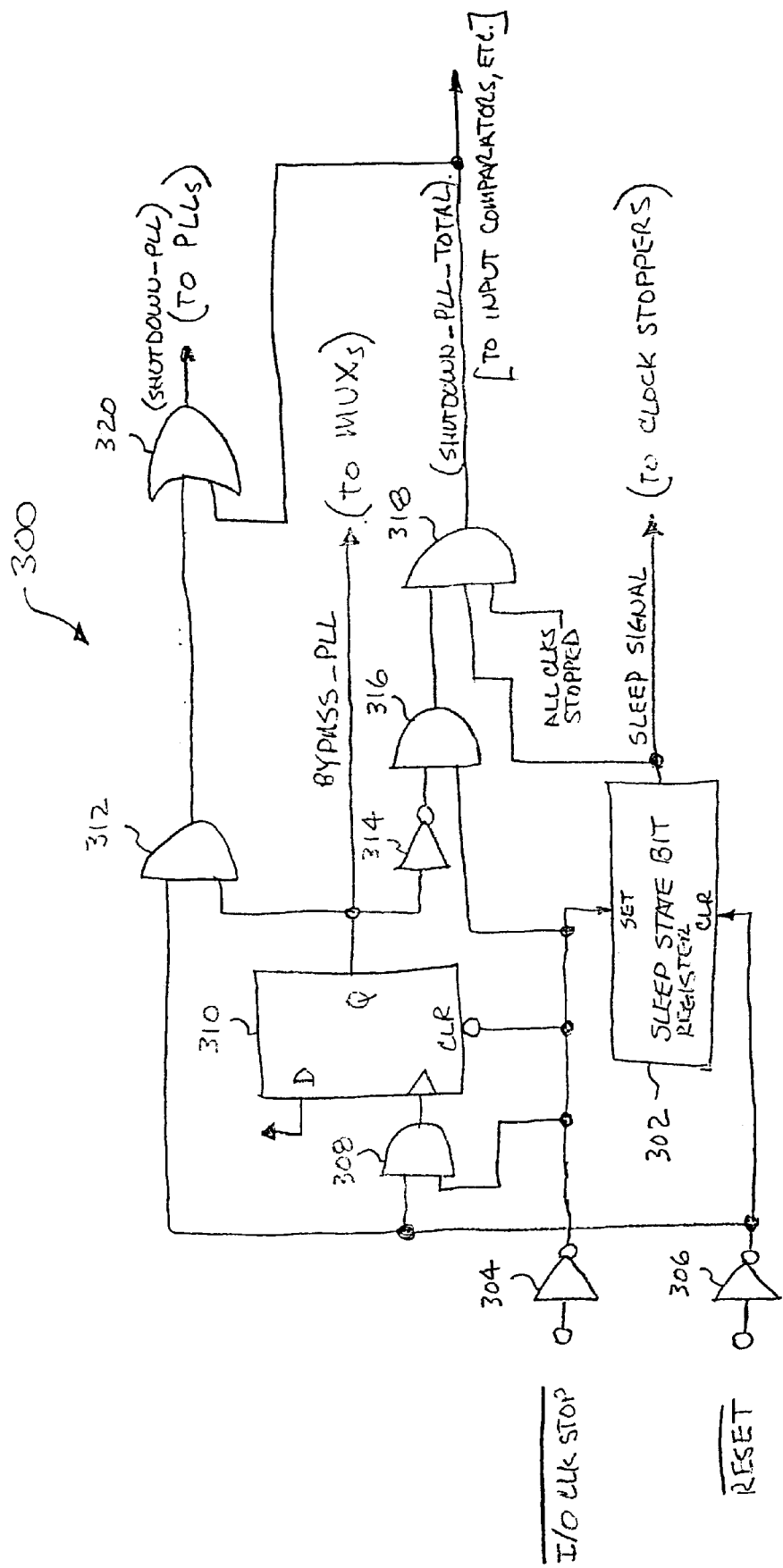
FIG. 3A is a schematic diagram of a control circuit according to one embodiment of the invention.

FIG. 3A is a schematic diagram of a control circuit 300 according to one embodiment of the invention. The control circuit 300 is suitable for use within the I/O controller chip 202 illustrated in FIG. 2A. The control circuit 300 receives the I/O clock stop signal and the reset signal from the power manager 206 and produces control signals (e.g., sleep, bypass and shutdown signals) that are used by the clock generation circuitry to ensure that stable internal clocks are produced for the functional circuitry within the I/O controller chip 202.

The control circuit 300 includes a sleep state bit register 302 and inverters 304 and 306. The sleep state bit register 302 produces a sleep signal. The I/O clock stop (I/O CLK STOP) signal is inverted by the inverter 304, and the reset (RESET) signal is inverted by the inverter 306. The sleep state bit register 302 receives the inverted clock stop signal at a set terminal of the sleep state bit register 302, and receives an inverted reset signal at a clear terminal (CLR) of the sleep state bit register 302. When the inverted clock stop signal is high ("1"), the sleep state is set in the sleep state bit register 302, and thus the sleep signal is high ("1"), thereby stopping the clocks cleanly. When the inverted reset signal is high ("1"), the sleep state is cleared in the sleep state bit register 302, and thus the sleep signal is low ("0"), thereby allowing the clocks to run. A clear operation overrides a set operation if both the inverted clock stop signal and the inverted reset signal are high.

The inverted clock stop signal and the inverted reset signal are supplied to an AND gate 308. The output of the AND gate 308 is supplied to a clock terminal of a flip-flop 310. The data terminal (D) is pulled up to a high potential ("1"), and a clear terminal (CLR) is connected to the inverted clock stop signal. The flip-flop 310 also has an output terminal (Q) which outputs a bypass signal (BYPASS_PLL) that is supplied to the multiplexers, such as the multiplexers 210 and 216 illustrated in FIG. 2A. Accordingly, the bypass signal is high ("I") to request use of the bypass clock when the I/O clock stop signal and the reset signal are both asserted ("low") until the I/O clock stop signal is de-asserted ("high"). Typically, the bypass signal is supplied to a select terminal of the multiplexers to choose one of the input clocks to be the selected clock.

In addition, since the clock generation circuitry of the I/O controller chip 202 has a shut-down mode and a sleep mode in which the PLLs 208 and 214 can be turned off to reduce power consumption, the control circuit 300 includes an AND gate 312 that receives a first input from the inverted reset signal and a second input as the bypass signal.

Still further, the control circuit 300 can produce a signal that is used to provide even more power savings by the I/O controller chip 202. To provide such a deeper shutdown, the control circuit 300 further includes an inverter 314, an AND gate 316, and an AND gate 318. The inverter 314 inverts the bypass signal to produce an inverted bypass signal. The AND gate 316 receives the inverted bypass signal as a first input and receives the inverted clock stop signal as a second input. The output of the AND gate 316 is supplied to the AND gate 318 as a first input. The sleep signal produced by the sleep state bit register 302 is supplied to the AND gate 318 as a second input. A third input for the AND gate 318 is a signal indicating that all of the internal clocks have been stopped (e.g., by clock stoppers) as a result of the sleep signal. For example, with respect to the I/O controller chip 202 illustrated in FIG. 2A, the signal indicating that all the clocks have stopped would indicate that the clock stoppers 212 and 218 are both activated and thus prevent internal clocks from being supplied to the functional circuitry within the I/O controller chip 202. The output from the AND gate 318 is a total shutdown signal (SHUTDOWN_PLL_TOTAL). As an example, the total shutdown signal can operate to shutdown additional features of the I/O controller chip 202 besides the PLLs. For example, with respect to the clock generation circuitry, such additional features can include input comparator circuits, other clocks being produced or received by the I/O controller chip 202, etc.

Still further the control circuit 300 also includes an OR gate 320. The output of the AND gate 312 is supplied to a first input of the OR gate 320, and the total shutdown signal (SHUTDOWN_PLL_TOTAL) output from the AND gate 318 is supplied to a second input of the OR gate 320. The output of the OR gate 320 is a PLL shutdown signal (SHUTDOWN_PLL) which is supplied to the PLLs, such as the PLLs 208 and 214 illustrated in FIG. 2A. Normally, the shutdown signal disconnects the PLLs from power.

Figure 3B:
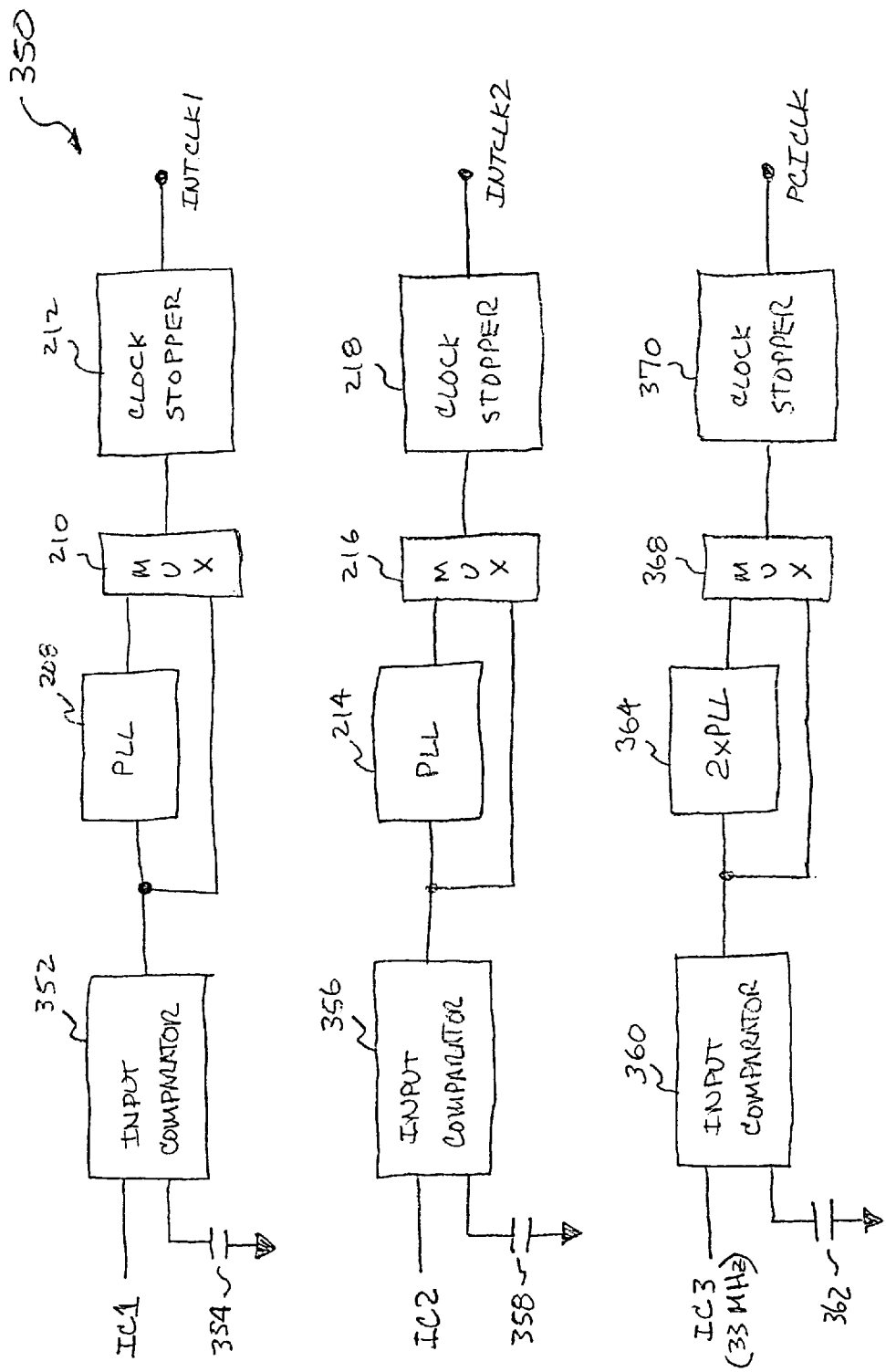
FIG. 3B is a block diagram of a controller chip according to another embodiment of the invention.

FIG. 3B is a block diagram of an I/O controller chip 350 according to another embodiment of the invention. Although not shown in FIG. 3B, the I/O controller chip 350 typically includes clock control circuitry such as the control circuit 300 shown in FIG. 3A.

The I/O controller chip 350 is similar to the I/O controller chip 202 illustrated in FIG. 2A. Specifically, the I/O controller chip 350 includes the circuitry 208–218 that produces first and second internal clocks (INTCLK1 and INTCLK2). In addition, to produce the first internal clock, the I/O controller chip 350 further includes an input comparator 352 and a capacitor 354. The input comparator 352 receives a first input clock (IC1) at a first input terminal and couples a second input terminal to ground through the capacitor 354. The input comparator 352 operates to remove common-mode noise from the first input clock (IC1). The circuitry 214–218 that produces the second internal clock (INTCLK2) also includes an input comparator 356 and a capacitor 358. The input comparator 356 receives a second input clock (IC2) at a first input terminal and couples a second input terminal of the input comparator 356 to ground through the capacitor 358. The input comparator 356 also removes common-mode noise from the second input clock (IC2).

The I/O controller chip 350 can also support specialized clocks that are often provided or utilized within computer systems. One such example of a specialized clock is a PCI clock (PCICLK). The PCI clock is normally run at 33 MHz but could also run at 66 MHz if the normal clock is not yet available. Hence, the I/O controller chip 350 receives a third input clock (IC3) at a first input terminal of an input comparator 360. A second input terminal of the input comparator 360 is coupled to ground through a capacitor 362. Here, the third input clock (IC3) has a frequency of 33 MHz. The input comparator 360 operates to reduce any common-mode noise that may be provided on the third input clock (IC3). The clock output by the input comparator 360 is supplied to a phase-lock loop (PLL) 364 which also includes a times-two (2×) multiplier. The PLL 364 produces a 66 MHz clock by multiplying the third input clock by a factor of two (2). A multiplexer 368 receives the 33 MHz clock and the 66 MHz clock and operates to select one of these clocks. The selected clock is then directed through a clock stopper 370 and becomes the PCI clock (PCICLK). It should also be noted that the power to the input comparators 352, 356 and 360 can be separately controlled by hardware or software to provide power savings, such as by power shut down when these components are not in use.

Figure 4:
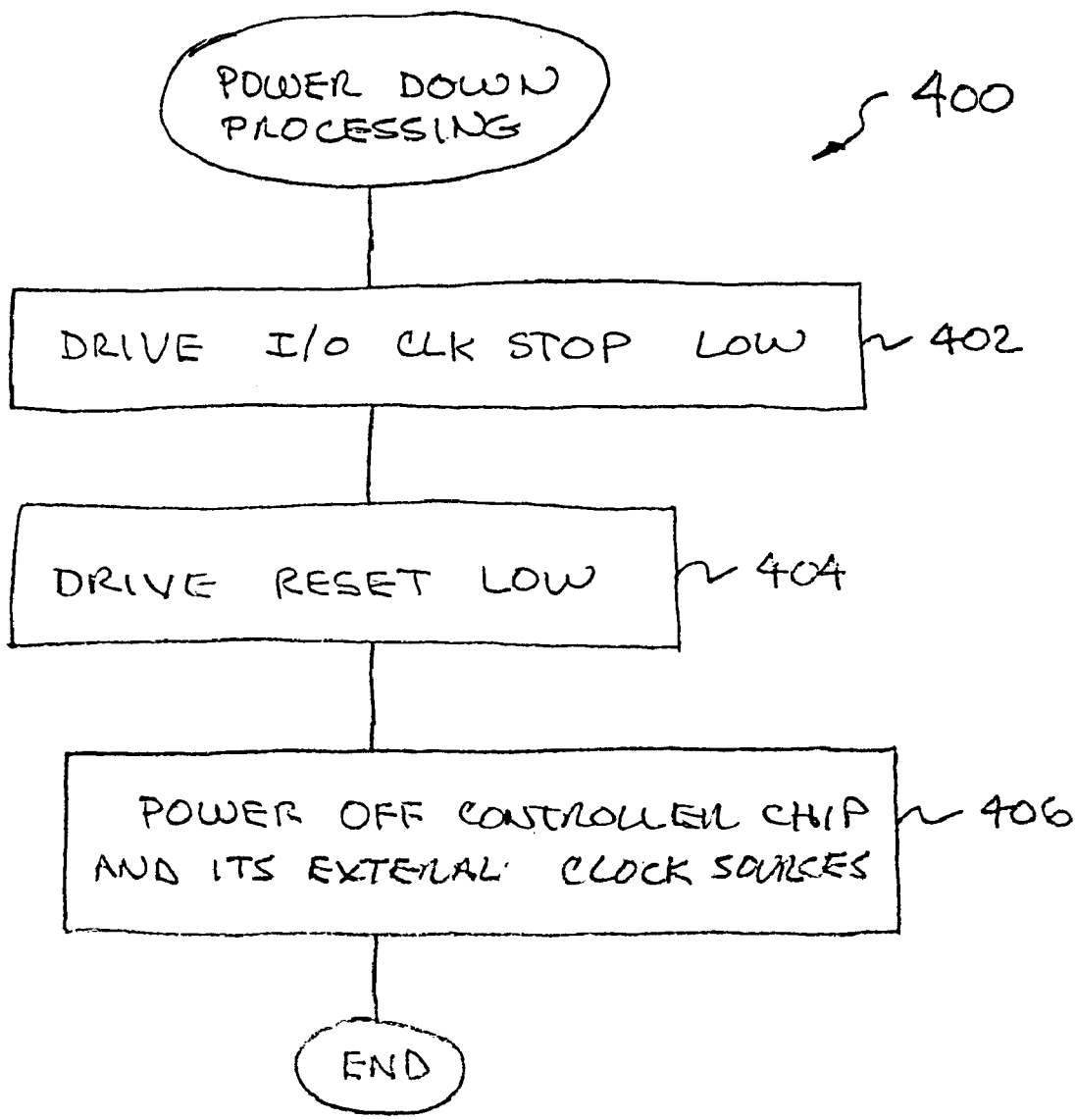
FIG. 4 is a flow diagram of power down processing according to one embodiment of the invention.

FIG. 4 is a flow diagram of power down processing 400 according to one embodiment of the invention. The power down processing 400 is the processing performed to power down a controller chip, such as the I/O controller chip 202 illustrated in FIG. 2A.

The power down processing 400 initially drives 402 the I/O clock stop signal (I/O CLK STOP) low. Then, the reset signal (RESET) is driven 404 low. In one embodiment, such as shown in FIG. 2A, the I/O clock stop signal and the reset signal can be supplied to the I/O controller chip 202 by a power manager, such as the power manager 206 illustrated in FIG. 2A. Accordingly, the power manager can determine when power down processing 400 should be performed. Alternatively, the power down processing 400 can also be driven or controlled by a state machine internal to the chip controller.

In any event, after the reset signal is driven 404 low, the power supplied to the controller chip and its external clock sources is turned off 406. For example, with respect to FIG. 2A, the power to the I/O controller chip 202 and the oscillator 204 is turned off. After the power is turned off, the power down processing 400 is complete and ends.

FIGS. 5A–5E pertain to power up processing for an I/O controller chip according to one embodiment of the invention. The power up processing is the processing performed to power up a controller chip, such as the I/O controller chip 202 illustrated in FIG. 2A. The power up processing is more sophisticated than the power down processing because the sequence of events and operations need to be controlled so that the internal clocks being produced by the clock generation circuitry are stable.

Figure 5A:
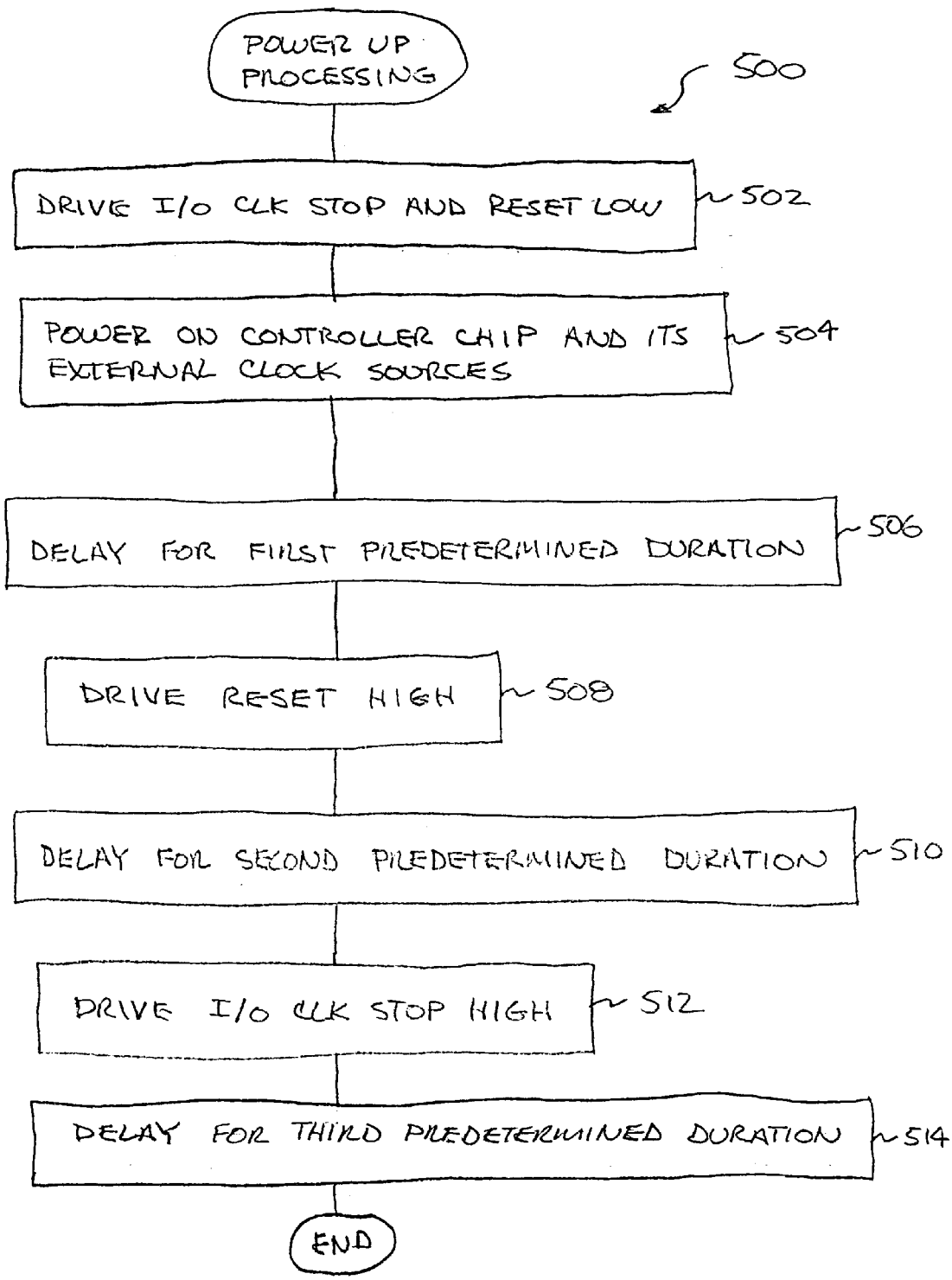
FIGS. 5A–5D pertain to power up processing for a controller chip according to one embodiment of the invention.

More particularly, FIG. 5A is a flow diagram of power up processing 500 according to one embodiment of the invention. The power up processing 500 initially drives 502 the I/O clock stop signal (I/O CLK STOP) and the reset signal (RESET) low. Then, the controller chip and its external clock sources are powered on 504. At this point, to allow the circuitry within the controller chip to process these signals, the power up processing delays 506 for a first predetermined duration. The first predetermined delay can vary widely with different implementations. For example, in one embodiment, the first predetermined duration is 10 milliseconds, which is the time required for the external clocks to stabilize.

After the first predetermined duration, the reset signal is driven 508 high. After the reset signal is driven 508 high, the power up processing 500 delays 510 for a second predetermined duration. Again, the delay is utilized so that the circuitry within the controller chip can process the signals (i.e., conform to the control conditions). The second predetermined delay can also vary widely with different implementations. For example, in one embodiment, the second predetermined delay is 250 microseconds, which is the time required for the PLLs to lock and stabilize.

After the delay for the second predetermined duration, the I/O clock stop signal (I/O CLK STOP) is driven 512 high, the power up processing 500 delays 514 for a third predetermined duration. Again, the delay is utilized so that the circuitry within the controller chip can process the signals (i.e., conform to the control conditions). The third predetermined delay can also vary widely with different implementations. For example, in one embodiment, the third predetermined delay is 1 microsecond, which is the minimum time required before software clears the sleep state bit (e.g., the sleep state bit register 302). In another embodiment, the third predetermined delay can represent the time required for the hardware to unbypass the clocks, and then clear the sleep state bit.

After the third predetermined duration, the internal clocks are supplied to the functional circuitry of the controller chip for normal operation. At this point the controller chip is powered-up and operable using the internal clocks which are deemed stable. Hence, the power up processing 500 is complete and ends. It should be noted that the first, second or third predetermined delays can be implemented in software, hardware, or a combination of software and hardware.

Figure 5B:
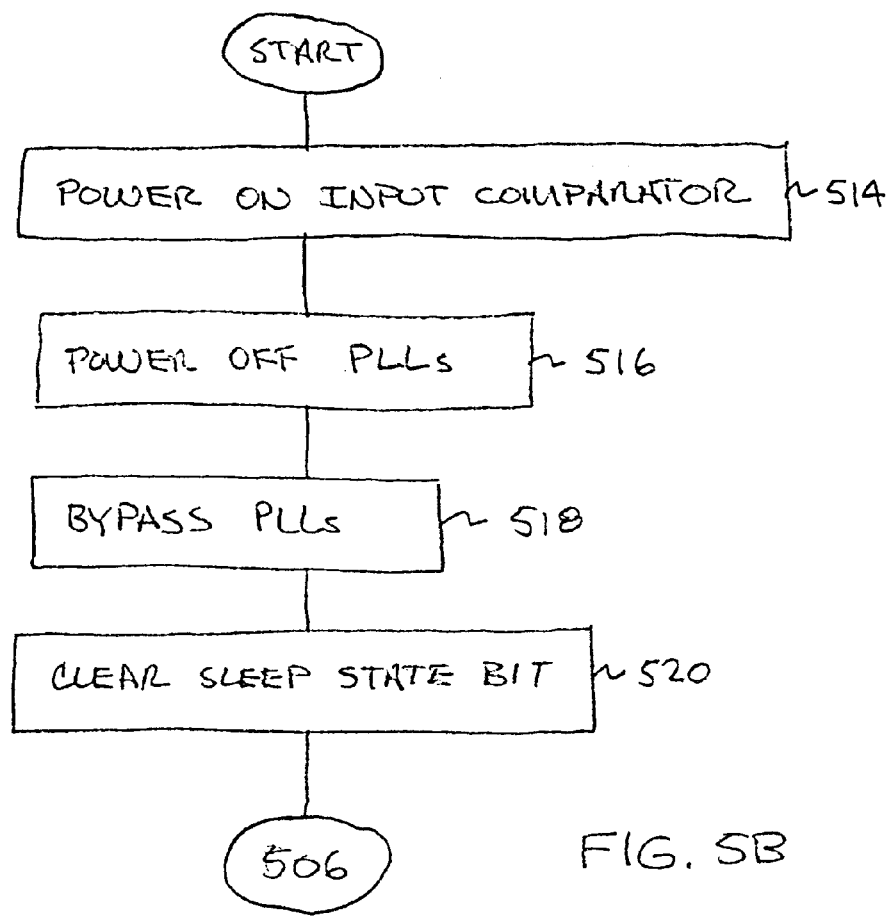

FIG. 5B is a flow diagram of processing that results from the driving of both the I/O clock stop signal and the reset signal low in block 504 of the power up processing 500 shown in FIG. 5A. Although, in some cases, the processing operation is not needed because it is the existing state or condition; nevertheless, for completeness and reliability reasons the processing is performed in any case.

Specifically, after the I/O clock stop signal and the reset signal are driven 504 low, any input comparators within the clock generation circuitry for the controller chip can be powered on 514. Input comparators are provided at the input of external clocks to the controller chip. Although not shown in FIG. 2A, the I/O controller chip 202 could include one or more input comparators associated with receiving the one or more input clocks at the I/O controller chip 202. Typically, the input comparators are used to compare the input clock to a common mode ground signal such that the common mode noise can be removed from the input clock signal. The I/O controller chip 350 shown in FIG. 3B, for example, includes input comparators 352, 356 and 360. Next, the PLLs are powered off 516. The controller chip also has the ability to separately control the supply of power to not only the input comparators but also the PLLs so as to better manage power consumption. The PLLs are then bypassed 518. As an example, the PLLs can be bypassed by selecting the bypass clock to pass through the multiplexers as the selected clock. For example, with respect to the I/O controller chip 202 illustrated in FIG. 2A, the multiplexer 210 can select the bypass clock to be the selected clock and thus the run clock (normal clock) is bypassed.

Next, the sleep state bit is cleared 520. At this point, the bypass clock is supplied to the functional circuitry of the controller chip (e.g., I/O controller chip 202) as an internal clock. This allows the functional circuitry to be properly reset in accordance with the reset signal (RESET) even though the actual operational clocks produced by the PLLs are not yet operable. In other words, during the initial stage of the power up of the controller chip, power is generally supplied to the controller chip but the PLLs and input comparators, if any, are not yet powered on. Hence, in order to process the reset request (by the reset signal in block 504), the controller chip makes use of a bypass clock that is available during this initial stage of the power up. By using the bypass clock to provide the clocking for the reset request, the functional circuitry within the controller chip can be properly reset. Following block 520, the processing returns to the block 506 illustrated in FIG. 5A.

Figure 5C:
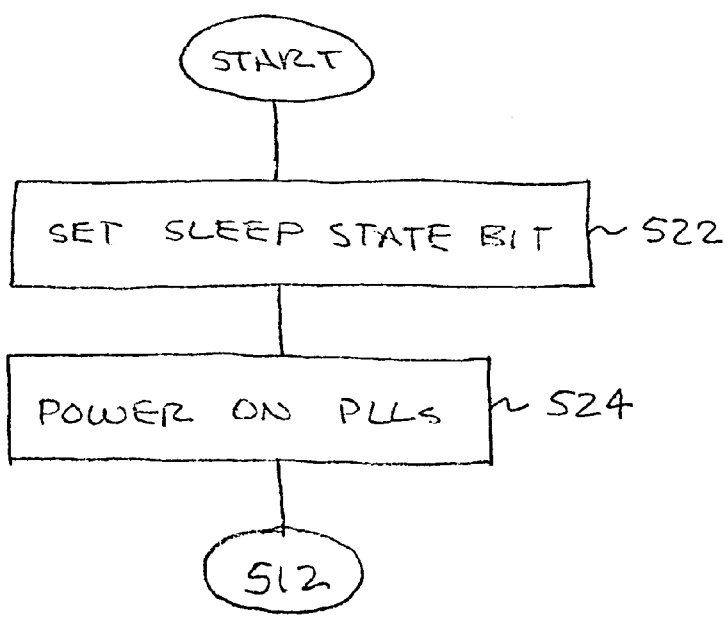

FIG. 5C is a flow diagram of processing that results from the driving of the reset signal high in block 508 of the power up processing 500 shown in FIG. 5A. Accordingly, during the delay 510 for the second predetermined duration, the processing shown in FIG. 5C is performed. Namely, the sleep state bit is set 522 and then the PLLs are powered on 524. Once the sleep state bit is set 522, the internal clock (here, the bypass clock) is blocked from reaching the functional circuitry of the controller chip. Also, at this point, the reset request has been fully processed so the use of the bypass clock is no longer needed. Then, the PLLs are powered on 524. Once powered, the PLLs start up and are allowed to stabilize with respect to the input clock (external clock) which is stable at this point.

Figure 5D:
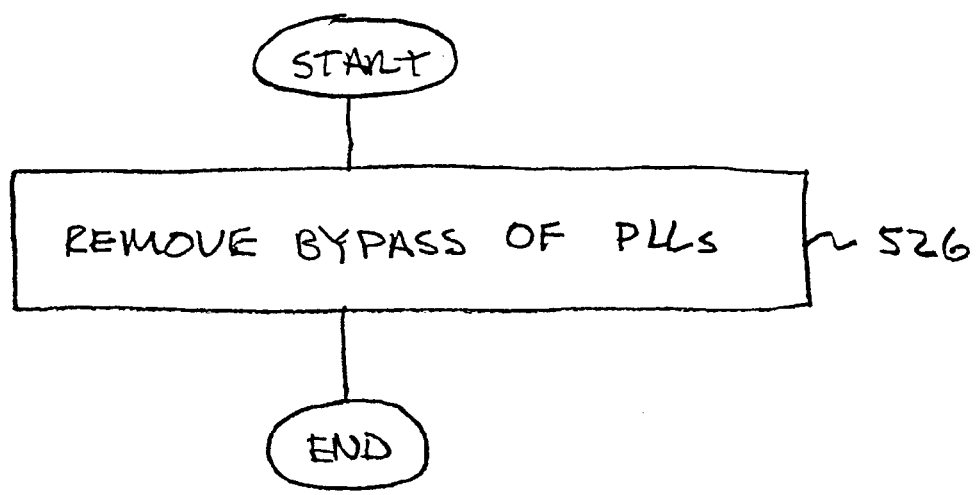

FIG. 5D is a flow diagram of processing that results from the driving of the I/O clock stop signal high in block 512 of the power up processing 500 shown in FIG. 5A. That is, after the I/O clock stop signal is driven high, the processing shown in FIG. 5D is performed. Namely, the bypassing of the PLLs is removed 526. The bypassing 518 during the initial stage is no longer needed and is therefore removed 526. At this point, the sleep state bit is set so that the selected clock is stopped from being supplied to the functional circuitry of the controller chip. The third predetermined delay 514 provides time for a switching operation associated with removal 526 of the bypassing to be performed.

Figure 5E:
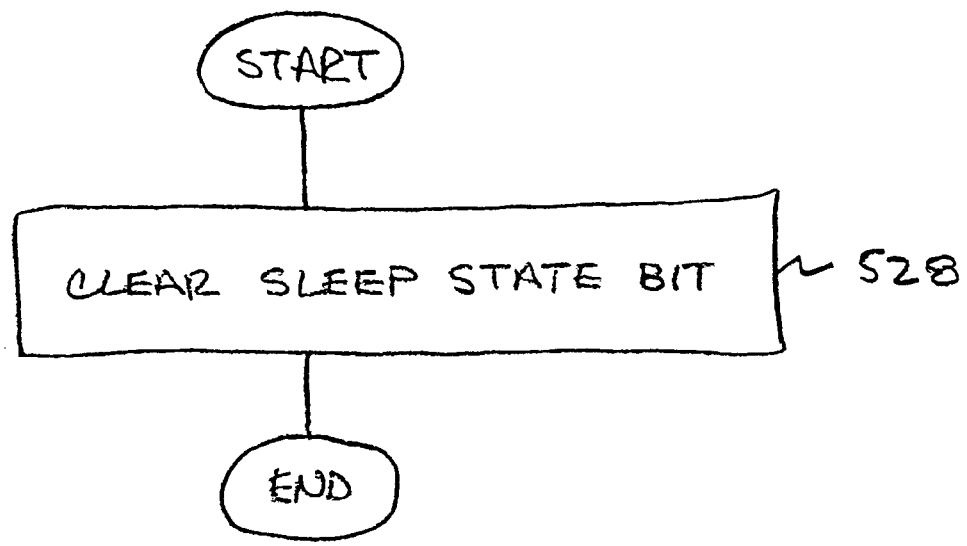

FIG. 5E is a flow diagram of processing that results after the third predetermined delay 514 of FIG. 5A. Namely, the sleep state bit is cleared 528. At this point, the run clocks (normal clocks) produced by the PLLs are stable and thus able to be reliably produced and provided by the clock generation circuitry to the functional circuitry as internal clocks. As a result, by using this sequence of operations for the power up processing 500, the internal clocks produced by PLLs that are provided to functional circuitry within the same integrated circuit chip are guaranteed to be stable.

The I/O controller chip 202 besides having a powered-up mode and a shut down mode, can also have a sleep mode in which some power saving is obtained for the I/O controller chip. In the sleep mode, the controller chip remains generally powered but the clock generation circuitry is largely shutdown to conserve power.

Figure 6:
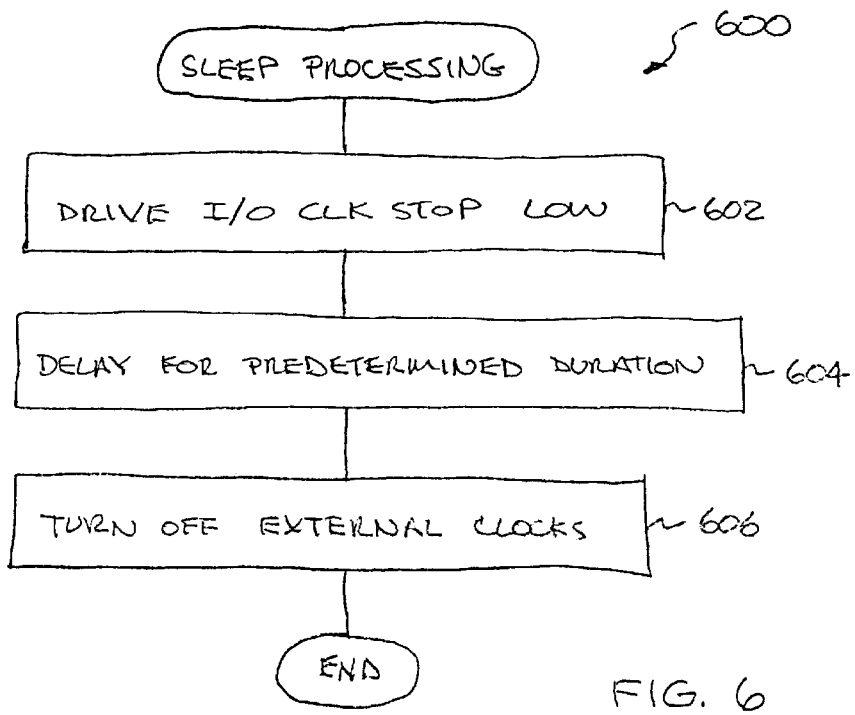
FIG. 6 is a flow diagram of sleep processing according to one embodiment of the invention.

FIG. 6 is a flow diagram of sleep processing 600 according to one embodiment of the invention. The sleep processing 600 is, for example, performed by the I/O controller chip 202 when entering a sleep mode. The sleep processing 600 initially drives 602 the I/O clock stop signal (I/O CLKSTOP) low. Next, there is a delay 604 for a predetermined duration so that processing in response to the I/O clock stop signal being driven low can be performed. According to one embodiment, in response to the I/O clock stop signal being driven 602 low, the sleep state bit is set (which cleanly stops all clocks from being supplied to the functional circuitry), the power to the PLLs is then removed, and the power to input comparators is also removed. Following the delay 604, the external clocks supplied to the I/O controller chip 202 can be turned off 606. Following block 606, the sleep processing 600 is complete and ends.

Once the I/O controller chip 202 is placed in a sleep mode, it needs to be awakened from the sleep mode to return to the run mode typically when there is activity that requires use of the functional circuitry of the I/O controller chip. The awakening of the I/O controller chip from the sleep mode can be performed by a particular sequence of operations.

Figure 7:
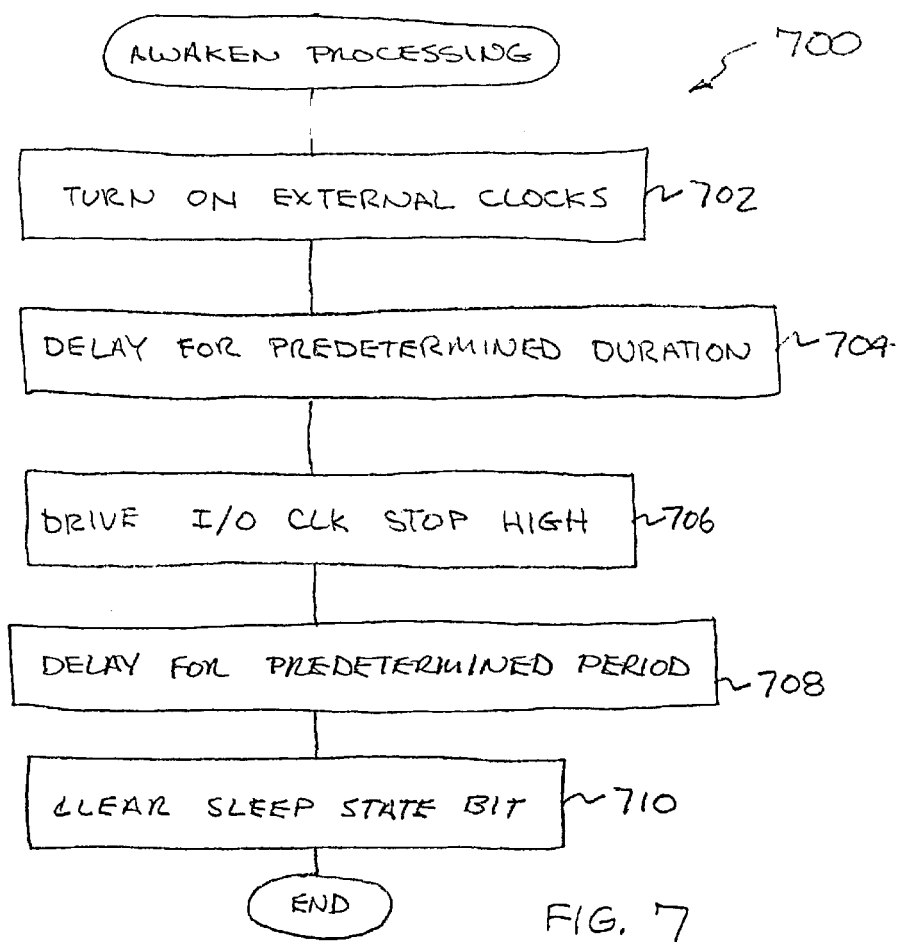
FIG. 7 is a flow diagram of awaken processing according to one embodiment of the invention.

FIG. 7 is a flow diagram of awaken processing 700 according to one embodiment of the invention. The awaken processing 700 serves to return the I/O controller chip 202 from the sleep mode to the run mode.

The awaken processing 700 initially turns on 702 the external clocks. Then, the awaken processing 700 delays 704 for a predetermined duration (e.g., 10 milliseconds). During the predetermined duration, the external clocks are stabilized. Next, the I/O clock stop signal is driven 706 high. In response to the I/O clock stop signal being driven 706 high, the input comparators are powered on, and then the PLLs are powered on, while the sleep state bit remains set. The awaken processing 700 delays 708 for a predetermined period (e.g., 250 microseconds) so that the processing responsive to the I/O stop signal being driven high can be performed. Following the delay 708, the sleep state bit is cleared 710, which cleanly starts the clocks driving into the functional circuitry. At this point, the awaken processing 700 is complete and ends as the internal clocks are now fully operational in a stable manner with respect to the clocks produced by the PLLs.

Although the invention has been primarily described above with respect to the I/O controller chip, the invention is suited for use with any type of controller chip or other functional chip that includes on-chip clock generation using PLLS. As examples, the controller chip or chip can pertain to an I/O controller, an interrupt controller, a bus controller, a microprocessor, an embedded controller, etc.

The invention can use a combination of hardware and software components. The software can be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices. The computer readable medium can also be distributed over a network coupled computer system so that the computer readable code is stored and executed in a distributed fashion.

The advantages of the invention are numerous. Different embodiments or implementations may have one or more of the following advantages. One advantage of the invention is that stable clock generation with power management can be performed internal to a functional integrated circuit. Another advantage of the invention is that functional integrated circuits are able to be properly reset upon being initially powered-up. Yet another advantage of the invention is that phase-lock loops (PLLs) used in the clock generation lock to desired frequencies in a stable manner. Still another advantage of the invention is that PLLs and clocks can be started and stopped cleanly and in the proper sequence, without having to reset the logic associated with those clocks, for power management.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An integrated circuit chip having internal functional circuitry, said integrated circuit chip receiving an external clock, a reset signal and a clock stop signal, said integrated circuit chip comprising:

a clock control circuit, said clock control circuit receives the reset signal and the clock stop signal and produces a clock control signal;

a phase lock loop circuit, said phase lock loop receives the external clock and produces a generated clock based on the external clock;

a multiplexer operatively connected to said phase lock loop circuit, said multiplexer receives the external clock and the generated clock, and said multiplexer outputs at an output terminal one of the external clock and the generated clock as a selected clock based on the clock control signal; and a clock stopper operatively connected to the output terminal of said multiplexer, said clock stopper operates to permit or block passage of the selected clock to the internal functional circuitry of said integrated circuit chip.

2. An integrated circuit chip as recited in claim 1, wherein said clock stopper operates to permit or block passage of the selected clock to the internal functional circuitry of said integrated circuit chip based one at least one of the reset signal and the clock stop signal.

3. An integrated circuit chip as recited in claim 2, wherein said integrated circuit is part of a computer, and wherein said clock stopper is under control by software running on said computer.

4. An integrated circuit chip as recited in claim 1, wherein said integrated circuit chip is an Input/Output (I/O) controller chip.

5. An integrated circuit chip as recited in claim 1, wherein said integrated circuit chip is an interrupt controller chip.

6. An integrated circuit chip as recited in claim 1, wherein said integrated circuit chip has a low power mode in which power is selectively removed from said phase lock loop circuit when the generated clock is not needed.

7. An integrated circuit chip as recited in claim 1, wherein said clock stopper operates to cleanly permit or block passage of the selected clock to the internal functional circuitry of said integrated circuit chip substantially without spikes or short pulses.

8. A functional integrated circuit chip for providing control functions for a computer system, said functional integrated circuit chip comprising:

an on-board clock generation circuit that produces a plurality of clocks; and functional circuitry that operates using the plurality of clocks, wherein said on-board clock generation circuit includes at least a clock control circuit, said clock control circuit receives a reset signal and a clock stop signal and produces a clock control signal;

a phase lock loop circuit, said phase lock loop receives an external clock and produces a generated clock based on the external clock;

a multiplexer operatively connected to said phase lock loop circuit, said multiplexer receives the external clock and the generated clock, and said multiplexer outputs at an output terminal one of the external clock and the generated clock as a selected clock based on the clock control signal; and a clock stopper operatively connected to the output terminal of said multiplexer, said clock stopper operates to cleanly permit or block passage of the selected clock to said functional circuitry of said functional integrated circuit chip.

9. A functional integrated circuit chip as recited in claim 8, wherein said on-board clock generation circuit has a run mode and a low-power mode, in the run mode the selected clock is supplied to said functional circuitry, and in the low-power mode said clock stopper prevents the selected clock from being supplied to said functional circuitry.

10. A functional integrated circuit chip as recited in claim 9, wherein said on-board clock generation circuit further has a clock start-up mode, in the clock start-up mode the selected clock is the external clock and is used to clock a reset through said functional integrated circuit chip.

11. A functional integrated circuit chip as recited in claim 10, wherein said functional integrated circuit chip is an input/output (I/O) controller chip or an interrupt controller chip.

12. A functional integrated circuit as recited in claim 8,
wherein said on-board clock generation circuit further comprises:
means for producing a bypass signal, and
wherein said multiplexer outputs at the output terminal one of the external clock and the generated clock based on the bypass signal.

13. A functional integrated circuit chip for providing control functions for a computer system, said functional integrated circuit chip comprising:
an on-board clock generation circuit that produces a plurality of clocks; and
functional circuitry that operates using the plurality of clocks,
wherein said on-board clock generation circuit includes at least
a clock control circuit, said clock control circuit receives a reset signal and a clock stop signal and produces a phase lock loop shutdown control signal;
a phase lock loop circuit, said phase lock loop receives an external clock and produces a generated clock based on the external clock;
a clock stopper operatively connected to the output of said phase lock loop, said clock stopper operates to cleanly permit or block passage of either the external clock or the generated clock to said functional circuitry of said functional integrated circuit chip,
wherein said on-board clock generation circuit has a run mode and a low-power mode, in the run mode the generated clock is supplied to said functional circuitry, and in the low-power mode said clock stopper prevents either the external clock or the generated clock from being supplied to said functional circuitry, and
wherein in the low-power mode, the phase lock loop shutdown control signal causes said phase lock loop circuit to shutdown said phase lock loop, thereby reducing power consumption.

14. A functional integrated circuit chip as recited in claim 13, wherein the low-power mode is a shutdown mode, and a reset operation associated with a power-up, following the shutdown mode, operates to supply the external clock through said clock stopper to said functional circuitry so that the reset operation can be performed.

15. A functional integrated circuit chip as recited in claim 13, wherein said functional integrated circuit chip is an input/output (I/O) controller chip or an interrupt controller chip.

16. A functional integrated circuit chip as recited in claim 13,
wherein when transitioning from the low-power mode to the run mode, said functional integrated circuit chip is reset and for a first period of time during the transitioning the external clock passes through said clock stopper so that said functional circuitry can be reset,
wherein after the first period of time during the transitioning, said phase lock loop circuit is powered-on, and
wherein after a second period of time following the powering-on of said phase lock loop circuit, the generated clock is produced and stable and passes through said clock stopper so as to achieve the run mode.

17. A computer system, comprising:
a memory device that stores computer code;
a microprocessor chip that executes the computer code;
a peripheral bus; and
a chip for said peripheral bus, said chip comprising an on-board clock generation circuit that produces a plurality of clocks, and functional circuitry that operates using the plurality of clocks to control interaction with said peripheral bus,
wherein said on-board clock generation circuit includes at least
a clock control circuit, said clock control circuit receives a reset signal and a clock stop signal and produces a clock control signal;
a phase lock loop circuit, said phase lock loop receives the external clock and produces a generated clock based on an external clock;
a multiplexer operatively connected to said phase lock loop circuit, said multiplexer receives the external clock and the generated clock, and said multiplexer outputs at an output terminal one of the external clock and the generated clock as a selected clock based on the clock control signal; and
a clock stopper operatively connected to the output terminal of said multiplexer, said clock stopper operates to permit or block passage of the selected clock to said functional circuitry of said chip.

18. A functional integrated circuit chip as recited in claim 17, wherein said on-board clock generation circuit has a run mode and a low-power mode, in the run mode the selected clock is supplied to said functional circuitry, and in the low-power mode said clock stopper prevents the selected clock from being supplied to said functional circuitry.

19. A functional integrated circuit chip as recited in claim 18, wherein said on-board clock generation circuit further has a clock start-up mode, in the clock start-up mode the selected clock is the external clock and is used to clock a reset through said chip.

20. A method for powering up an integrated circuit chip having functional circuitry and internal clock generation circuitry including phase-locked loops (PLLs) to produce internal clocks, said method comprising:
(a) providing power to the integrated circuit chip and to an external clock source but not providing power to the PLLs;
(b) bypassing the PLLs to produce an externally generated clock, the externally generated clock being provided by the external clock source;
(c) permitting the externally generated clock to be supplied to the functional circuitry, thereby allowing processing of a reset operation while the PLLs are not producing the internal clocks;

(d) subsequently stopping the externally generated clock from being supplied to the functional circuitry after the reset operation is processed;

(e) providing power to the PLLs;

(f) unbypassing the PLLs; and (g) thereafter permitting the internal clocks produced by the PLLs to be supplied to the functional circuitry, so as to operate the functional circuitry in a normal manner.

21. A method as recited in claim 20, wherein said stopping (d) is invoked after a first predetermined delay following said permitting (c).

22. A method as recited in claim 21, wherein said unbypassing (f) is invoked after a second predetermined delay following said stopping (d).

23. A method as recited in claim 22, wherein said permitting (g) is invoked after a third predetermined delay following said unbypassing (f).

24. A method as recited in claim 23, wherein the internal clocks produced by the PLLs and supplied to the functional circuitry are stabilized by said method.

25. A method as recited in claim 20, wherein the internal clocks produced by the PLLs and supplied to the functional circuitry are stabilized by said method.

26. A method as recited in claim 20, wherein the integrated circuit chip is a chip including the functional circuitry and the internal clock generation circuitry.

27. A method as recited in claim 20, wherein the chip is an I/O controller chip.

* * * * *